United States Patent
Akao (10) Patent No.: US 10,635,369 B2
(45) Date of Patent: Apr. 28, 2020

(54) PRINTING SYSTEM AND NON-TRANSITORY COMPUTER-READABLE RECORDING MEDIUM

(71) Applicant: Roland DG Corporation, Hamamatsu-shi, Shizuoka (JP)

(72) Inventor: Yoshihiko Akao, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 16/270,662

(22) Filed: Feb. 8, 2019

(65) Prior Publication Data

US 2019/0265928 A1    Aug. 29, 2019

(30) Foreign Application Priority Data

Feb. 23, 2018    (JP) ................................. 2018-031217

(51) Int. Cl.
G06F 3/12    (2006.01)
G06K 15/02    (2006.01)

(52) U.S. Cl.
CPC .......... *G06F 3/1262* (2013.01); *G06F 3/1215* (2013.01); *G06F 3/1282* (2013.01)

(58) Field of Classification Search
None
See application file for complete search history.

(56) References Cited

U.S. PATENT DOCUMENTS

| | | | | |
|---|---|---|---|---|
| 5,726,897 A * | 3/1998 | Tammi | ...................... | B07C 1/00 700/221 |
| 6,088,135 A * | 7/2000 | Kusumoto | ......... | H04N 1/00567 358/496 |
| 8,553,248 B2 * | 10/2013 | Kumagai | ............... | G06F 3/1211 358/1.13 |
| 9,891,569 B2 * | 2/2018 | Konishi | .................. | G03G 15/55 |
| 10,118,416 B2 * | 11/2018 | Handa | ................. | G06K 15/1809 |
| 2002/0135792 A1 * | 9/2002 | Sommer | ................ | G06K 15/00 358/1.13 |
| 2006/0055952 A1 * | 3/2006 | Ferlitsch | ................. | G06K 15/02 358/1.13 |
| 2006/0055974 A1 * | 3/2006 | Yamaguchi | ........... | G06F 3/1217 358/1.16 |
| 2006/0139690 A1 * | 6/2006 | Yagita | ................... | G06F 3/1204 358/1.15 |
| 2009/0213161 A1 | 8/2009 | Murai | | |

(Continued)

FOREIGN PATENT DOCUMENTS

JP    2009-230738 A    10/2009

*Primary Examiner* — Beniyam Menberu
(74) *Attorney, Agent, or Firm* — Keating & Bennett, LLP (57) ABSTRACT

A printing system includes a print manager that creates a job list and a printer that preforms printing on a target printing material, based on the job list. The print manager includes a continuous printing information provider that gives continuous printing information to each of print jobs. The printer includes a continuous printing determiner to continuously start, if specified by the continuous print information of the print job to perform continuous printing, printing of a next one of the print jobs, and, not to start, if specified by the continuous print information of the print job not to perform continuous printing, printing of the next one of the print jobs.

17 Claims, 3 Drawing Sheets

(56) References Cited

U.S. PATENT DOCUMENTS

| | | | |
|---|---|---|---|
| 2010/0271656 A1* | 10/2010 | Morales | G06F 3/1217 358/1.15 |
| 2012/0075656 A1* | 3/2012 | Yasukawa | G06K 15/005 358/1.14 |
| 2012/0224220 A1* | 9/2012 | Toriumi | G06F 3/1204 358/1.15 |
| 2013/0113868 A1* | 5/2013 | Veis | B41J 11/0015 347/102 |
| 2013/0194326 A1* | 8/2013 | Ito | B41J 2/1707 347/6 |
| 2014/0355054 A1* | 12/2014 | Oi | G06F 3/1211 358/1.15 |
| 2015/0268908 A1* | 9/2015 | Yagi | G06F 3/1212 358/1.15 |
| 2015/0375493 A1* | 12/2015 | Wang | A63J 5/021 428/195.1 |
| 2016/0253130 A1* | 9/2016 | Rajalingam | G06F 3/1205 358/1.15 |
| 2016/0292543 A1* | 10/2016 | Oishi | H04N 1/00938 |
| 2017/0282594 A1* | 10/2017 | Akao | B41J 3/4073 |
| 2017/0299993 A1* | 10/2017 | Kaminaka | G03G 15/6517 |
| 2017/0344862 A1* | 11/2017 | Tanabe | G06K 15/1809 |

\* cited by examiner

| FILE No. | PRINT JOB No. | PRINT MODE | | | | BACK SURFACE PRINTING OF TARGET PRINTING MATERIAL | CONTINUOUS PRINTING INFORMATION |
|---|---|---|---|---|---|---|---|
| | | PRIMER | WHITE | PROCESS COLOR | COATING | | |
| 1 | 1 | | ● | | | OFF | ON |
| | 2 | | | ● | | OFF | ON |
| | 3 | | | | ● | OFF | OFF |
| 2 | 1 | | ● | | | OFF | ON |
| | 2 | | | ● | | OFF | OFF |
| 3 | 1 | | ● | | | OFF | ON |
| | 2 | | | | ● | OFF | OFF |
| 4 | 1 | | | ● | | OFF | ON |
| | 2 | | | | ● | OFF | OFF |
| 5 | 1 | ● | | | | OFF | ON |
| | 2 | | ● | | | OFF | OFF |
| 6 | 1 | ● | | | | OFF | ON |
| | 2 | | | ● | | OFF | OFF |
| 7 | 1 | ● | | | | OFF | ON |
| | 2 | | ● | | | OFF | ON |
| | 3 | | | ● | | OFF | OFF |
| 8 | 1 | ● | | | | OFF | ON |
| | 2 | | ● | | | OFF | ON |
| | 3 | | | ● | | OFF | ON |
| | 4 | | | | ● | OFF | OFF |
| 9 | 1 | | | ● | | ON | ON |
| | 2 | | ● | | | OFF | OFF |
| 10 | 1 | | | ● | | ON | ON |
| | 2 | | ● | | | ON | OFF |
| 11 | 1 | | | ● | | ON | ON |
| | 2 | | ● | | | OFF | ON |
| | 3 | | | ● | | OFF | OFF |
| 12 | 1 | | | ● | | ON | ON |
| | 2 | | ● | | | OFF | ON |
| | 3 | | | ● | | OFF | ON |
| | 4 | | | | ● | OFF | OFF |
| 13 | 1 | | | ● | | ON | ON |
| | 2 | | ● | | | OFF | ON |
| | 3 | | | ● | | OFF | ON |
| | 4 | | | | ● | ON | OFF |
| 14 | 1 | ● | | | | ON | ON |
| | 2 | | | ● | | ON | ON |
| | 3 | | ● | | | OFF | OFF |
| 15 | 1 | ● | | | | ON | ON |
| | 2 | | | ● | | ON | ON |
| | 3 | | ● | | | ON | OFF |
| 16 | 1 | ● | | | | OFF | ON |
| | 2 | | | ● | | ON | ON |
| | 3 | | ● | | | OFF | OFF |
| 17 | 1 | ● | | | | OFF | ON |
| | 2 | | | ● | | ON | ON |
| | 3 | | ● | | | ON | OFF |
| 18 | 1 | ● | | | | OFF | ON |
| | 2 | | | ● | | ON | ON |
| | 3 | | ● | | | OFF | ON |
| | 4 | | | ● | | OFF | OFF |
| 19 | 1 | ● | | | | ON | ON |
| | 2 | | | ● | | ON | ON |
| | 3 | | ● | | | OFF | ON |
| | 4 | | | ● | | OFF | OFF |
| 20 | 1 | ● | | | | OFF | ON |
| | 2 | | | ● | | ON | ON |
| | 3 | | ● | | | OFF | ON |
| | 4 | | | ● | | OFF | ON |
| | 5 | | | | ● | OFF | OFF |
| 21 | 1 | ● | | | | OFF | ON |
| | 2 | | | ● | | ON | ON |
| | 3 | | ● | | | OFF | ON |
| | 4 | | | ● | | OFF | ON |
| | 5 | | | | ● | ON | OFF |
| 22 | 1 | ● | | | | ON | ON |
| | 2 | | | ● | | ON | ON |
| | 3 | | ● | | | OFF | ON |
| | 4 | | | ● | | OFF | ON |
| | 5 | | | | ● | OFF | OFF |
| 23 | 1 | ● | | | | ON | ON |
| | 2 | | | ● | | ON | ON |
| | 3 | | ● | | | OFF | ON |
| | 4 | | | ● | | OFF | ON |
| | 5 | | | | ● | ON | OFF |

PRINTING SYSTEM AND NON-TRANSITORY COMPUTER-READABLE RECORDING MEDIUM

CROSS REFERENCE TO RELATED APPLICATIONS

This application claims the benefit of priority to Japanese Patent Application No. 2018-031217 filed on Feb. 23, 2018. The entire contents of this application are hereby incorporated herein by reference.

BACKGROUND OF THE INVENTION

1. Field of the Invention

The present invention relates to a printing system and a non-transitory computer-readable recording medium.

2. Description of the Related Art

Conventionally, printing systems which superimpose and print a plurality of ink layers on a target printing material using a plurality of types of inks in order to increase quality of the printing material and improve a design thereof have been known. For example, a printing system described in Japanese Laid-open Patent Publication No. 2009-230738 includes a printer and a print request terminal communicably coupled to the printer. In the printing system, first, a job list (a list of print jobs) is created in the print request terminal and is transmitted to the printer. The job list is print data in which the print jobs that indicate print processing for each ink layer are arranged in an execution order. The printer receives the job list from the print request terminal and sequentially executes printing, based on the job list. Thus, a print product in which a plurality of ink layers is superimposed and printed on a target printing material is achieved.

In the above described known printing system, setting of an on/off of continuous printing is performed in a printer side. Due to this, according to a discovery made by the inventor of preferred embodiments of the present invention described and claimed in the present application, when mass production of a print product is desired, there are problems in which a user's operation is complicated, in which production efficiency is reduced, or the like. As an example, using a job list of Table 1 below, a case in which the same print product is achieved consecutively four times is assumed. The job list of Table 1 includes print jobs 1 to 12 and is configured by repetition of a print mode in which a white ink, a process color link, and a coating ink are superimposed and printed in this order. In this case, each time a user executes three print jobs (the printer jobs 1 to 3, 4 to 6, 7 to 9, or 10 to 12) to form three ink layers on the target printing material by the printer, the user needs to replace the target printing material.

Here, the user transmits the job list including the print jobs 1 to 12 to the printer in a state in which continuous printing is set off to start printing. Then, the plurality of print jobs is not continuously executed and, each time one print job ends, a printing operation is suspended. Therefore, the user needs to operate an operation panel of the printer and instructs the printer to resume printing and to execute printing of next print job each time. As a result, while printing is performed by the printer, the user cannot leave from a site in which the printer is located and has to stay near the printer.

As another example, the job list including the jobs 1 to 12 is transmitted to the printer in which continuous printing is set on to cause the printer to start printing. Then, all of the print jobs are continuously executed. In other words, all of the print jobs are continuously printed. Note that the term "continuous printing" as used herein means printing in which, after one print job ends, the printer continuously starts a next print job without a user's instruction to operate the operation panel of the printer and execute the next print job. However, during continuous printing, there is no timing at which the user replaces the target printing material. Therefore, in order to ensure a timing at which the user replaces the target printing material, the user is bothered to divide the job list for each print product and transmit the job list to the printer by a plurality of separate transmissions. That is, the user needs to first transmit a first job list including the jobs 1 to 3 to the printer to perform printing of a first print product, replace the target printing product, and then, transmit a second job list including the jobs 4 to 6 to perform printing of a second print product next. As a result, a user's operation has become complicated and production efficiency has been reduced. Moreover, for example, in a case in which the print request terminal and the printer are located in places apart from one another or like case, it is a heavy burden for the user to move back and forth between devices.

TABLE 1

Table 1 Example of Job List

| Print Job No. | Print Mode | (Print Product) |
|---|---|---|
| Job 1 | Printing with White Ink | |
| Job 2 | Printing with Process Color Ink | |
| Job 3 | Printing with Coating Ink | → Complete, replace |
| Job 4 | Printing with White Ink | |
| Job 5 | Printing with Process Color Ink | |
| Job 6 | Printing with Coating Ink | → Complete, replace |
| Job 7 | Printing with White Ink | |
| Job 8 | Printing with Process Color Ink | |
| Job 9 | Printing with Coating Ink | → Complete, replace |
| Job 10 | Printing of White Ink | |
| Job 11 | Printing of Process Color Ink | |
| Job 12 | Printing of Coating Ink | → Complete |

SUMMARY OF THE INVENTION

In view of the above described points, preferred embodiments of the present invention provide printing systems that are suitable to mass production.

A printing system according to a preferred embodiment of the present invention includes a print management device that creates a job list in which one or more print jobs are arranged in an execution order, and a printer that performs printing on a target printing material, based on the job list. The print management device includes a continuous printing information provider that is configured or programmed to give, to each of the print jobs, continuous printing information in which whether or not next one of the print jobs is to be continuously printed is specified. The printer includes a continuous printing determiner that is configured or programmed to continuously start, if it is specified by the continuous printing information of the print job to perform continuous printing, printing of a second print job after printing of a first print job is completed and, on the other hand, not to start, if it is specified by the continuous printing information of the print job not to perform continuous printing, printing of the second print job after printing of the first print job is completed.

The job list that is created by the print management device includes continuous printing information for each print job. The printer determines whether or not continuous printing of a next print job is to be performed for each print job, based on the job list. Thus, for example, it is possible to continuously execute print jobs between which it is not needed to replace the target printing material or the like and, on the other hand, to suspend print processing at a timing at which the target printing material is replaced. Therefore, in the printing system, the job list in which print jobs of a plurality of print products are combined together is able to be transmitted to the printer by a series of outputs. In other words, even in a case in which it is needed to replace the target printing material in the middle of the job list, the print jobs are able to be combined together as one unit without dividing the job list into pieces. Thus, a burden of the user is able to be reduced and an operation of printing is able to be smoothly performed. As a result, efficiency of printing is able to be increased and a large quantity of print products is able to be mass produced at low cost.

A non-transitory computer-readable recording medium according to another preferred embodiment of the present invention stores a computer program that causes a computer to operate as the above described print management device.

According to a preferred embodiment of the present invention, a printing system that is suitable to mass production is able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. The preferred embodiments described below are not intended to specifically limit the present invention. Components and portions that have the same functions will bear the same reference signs, and overlapping descriptions will be omitted or simplified optionally.

Figure 1:
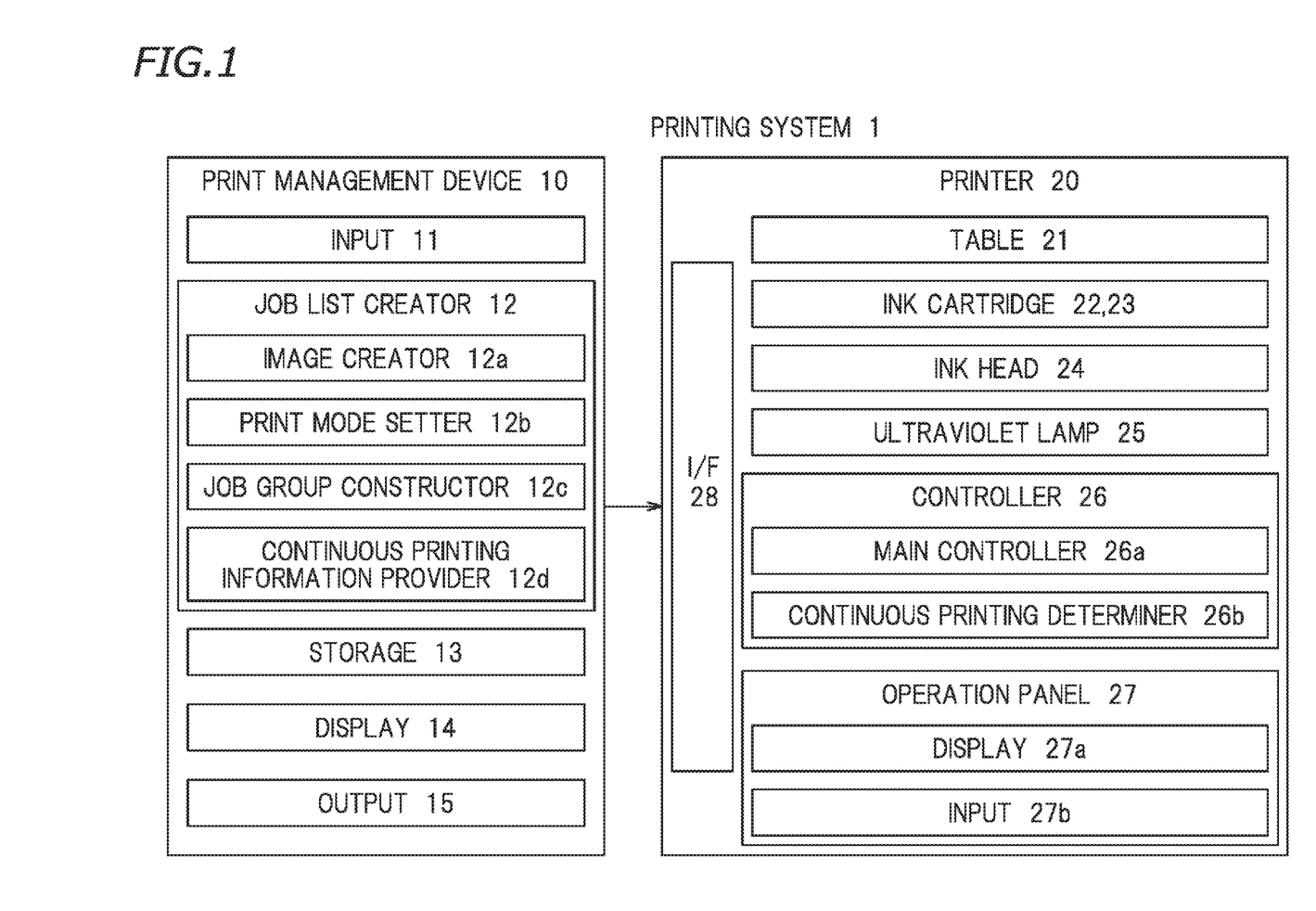
FIG. 1 is a block diagram illustrating a configuration of a printing system according to a preferred embodiment of the present invention.

FIG. 1 is a block diagram illustrating a configuration of a printing system 1. The printing system 1 includes a print management device 10 and a printer 20. The print management device 10 and the printer 20 are communicably coupled to one another by a wired or wireless connection. The print management device 10 is configured or programmed to create a job list in which one or more print jobs are arranged in an execution order and transmit the job list to the printer 20. The printer 20 is configured or programmed to receive the job list that has been transmitted from the print management device 10 and print an image on a target printing material, based on the job list. Note that the term "image" as used herein is a generic name that includes a character, a number, a symbol, a design, a pattern, a photograph, or the like.

A type of the target printing material is not particularly limited. The target printing material may be, for example, a sheet, such as printing paper, transfer paper, a card, or the like, and may be a solid object, such as various types of cases, such as a mobile phone case or the like, a small-size electronic equipment, such as an electronic cigarette or the like, a small article, such as a keyholder, a photo frame, a welcome board, or the like, daily necessities, an accessory, or the like. Also, a material of the target printing material may be, as a matter of course, paper, such as plain paper, inkjet printing paper, or the like, and may be resin, such as polyvinyl chloride, acryl, polycarbonate, polystyrene, acrylonitrile-butadiene-styrene (ABS) copolymer, or the like, metal, such as aluminum, stainless steel, or the like, carbon, pottery, ceramic, glass, rubber, leather, or the like.

The printer 20 preferably is a photocurable inkjet printer. However, the printer 20 is not limited thereto. Note that the term "inkjet printer" as used herein means in general a printer which uses a printing method involving any of various inkjet techniques known in the art, including, for example, various continuous methods, such as a binary deflection method, a continuous deflection method, or the like, various on-demand methods, such as a thermal method, a piezoelectric method, or the like.

The printer 20 is, for example, a flatbed printer. The printer 20 includes a table 21, ink cartridges 22 and 23, an ink head 24, an ultraviolet lamp 25, a controller 26, and an operation panel 27. The printer 20 may further include a cutter to cut a target printing material.

The table 21 is an example of a supporting member of the target printing material. The target material is placed on the table 21. If a size of the printing material on which printing is performed is sufficiently small as compared to the table 21, in view of mass productivity and production efficiency, a plurality of target printing materials may be simultaneously placed on the table 21. The target printing materials that are simultaneously placed on the table 21 may have the same shape and also may have different shapes. In a case in which a plurality of target printing materials is simultaneously placed on the table 21, among the plurality of target printing materials, ones of target printing materials which have the same shape can be put together and be assumed as one print product. Note that, in a case in which a plurality of target printing materials is placed on the table 21, a printing jig that includes a plurality of arrangement holes that store the plurality of target printing materials may be used such that positions of the plurality of target printing materials relative to one another are not misaligned. In this case, the plurality of target printing materials can be put together, for example, by a unit of a printing jig and be assumed to be one print product. The table 21 is movable relative to the ink head 24 by a table mover, which is not illustrated.

Each of the ink cartridges 22 and 23 stores an ultraviolet-curable ink. The ultraviolet-curable ink typically includes a polymerizable compound and a polymerization initiator. The ink cartridge 22 stores a process color ink. The process color ink is an ink that is used for image forming. The ink cartridge 22 includes four inks, that is, for example, a cyan ink (C), a magenta ink (M), a yellow ink (Y), and a black ink (K). The ink cartridge 23 stores a special color ink. The special color ink has a different color and/or property from a color and/or property of the process color ink stored in the ink cartridge 22. The ink cartridge 23 includes, in total, three inks, that is, for example, a primer ink, a white ink, and a coating ink.

The primer ink is a pretreatment ink used to cause, for example, when printing is performed on a printing material which has a high ink-repellent property, the printing material to take an ink well. The primer ink is an ink that is used for surface preparation before printing which uses another ink is performed on the target printing material. The primer ink is typically transparent. The white ink is an ink that is used in surface preparation performed to improve color development property of the process color ink, in addition to image forming. The coating ink is an ink used for surface processing. The coating ink is, for example, an ink that is used for surface finish after an image is printed using the process color ink or the white ink. The coating ink is typically transparent.

Note that, in this preferred embodiment, the printer 20 includes four ink cartridges 22 and three ink cartridges 23, for example, but the number of cartridges is not limited thereto. The printer 20 may not include the ink cartridge 22 or the ink cartridge 23. Also, each of the ink cartridges 22 and 23 may be independently provided and each of the number of the ink cartridges 22 and the number of the ink cartridges 23 may be one, two, three, four, five or more. The ink cartridge 23 may not include, for example, at least one of the primer ink, the white ink, and the coating ink.

The ink head 24 discharges an ink to a target printing material. The ink head 24 is able to discharge an ink to a target printing material placed on the table 21. Typically, the ink heads 24 of the same number as that of the ink cartridges 22 and 23 are provided, for example. In this preferred embodiment, the seven ink heads 24 in total are provided. Each of the ink heads 24 is communicated with a corresponding one of the ink cartridges 22 and 23 via an ink supply passage, such as an ink tube. The ink head 24 is movable relative to the table 21 by a carriage mover which is not illustrated.

The ultraviolet lamp 25 irradiates inks on a target printing material with ultraviolet rays to cure the inks on the target printing material. The ultraviolet lamp 25 has an ultraviolet wavelength with which inks are able to be cured. The ultraviolet lamp 25 may be, for example, a light emitting diode (LED), a fluorescent lamp (low-pressure mercury lamp), or a high-pressure mercury lamp. The number of the ultraviolet lamps 25 may be one and also may be two or more. Also, the ultraviolet lamp 25 is not necessarily provided and may be omitted. In such a case, an ink that is a type other than an ultraviolet-curable type may be stored in each of the ink cartridges 22 and 23.

The controller 26 is configured or programmed to control an operation of each of the elements of the printer 20, based on each print job in the job list that has been transmitted from the print management device 10. The controller 26 is configured or programmed to include a main controller 26a and a continuous printing determiner 26b. The main controller 26a is configured or programmed to form one ink layer or two or more ink layers on the target printing material, based on a print job. The main controller 26a is communicably coupled to a table mover and a carriage mover and controls a relative positional relation between a target printing material placed on the table 21 and the ink head 24. The main controller 26a is communicably coupled to the ink head 24 and controls discharge of inks to the target printing material. The main controller 26a is communicably coupled to the ultraviolet lamp 25 and controls start and stop of the ultraviolet lamp 25.

The continuous printing determiner 26b determines continuous printing information included in each print job in the job list. Specifically, the continuous printing determiner 26b is configured or programmed to start, if it is specified as the continuous printing information to perform continuous printing (if the continuous printing information is "ON"), printing of a next (second) print job continuously after printing of a first print job is completed. Also, the continuous printing determiner 26b is configured or programmed not to start, if it is specified as the continuous printing information not to perform continuous printing (if the continuous printing information is "OFF"), printing of the next (second) print job continuously after printing of the first print job is completed. In other words, the continuous printing determiner 26b is configured or programmed to suspend printing even when the job list includes the next print job. The user is able to, for example, replace the target printing material or check a print state of the target printing material while printing is suspended.

The continuous printing determiner 26b may be configured or programmed to display, if the continuous printing information of the print job is "ON", that continuous printing is being performed on a display 27a of the operation panel 27. The continuous printing determiner 26b may be configured or programmed to suspend, if the continuous printing information of the print job is "OFF", printing and notify a user that printing is being suspended. Notification to the user is able to be performed by displaying that printing is stopped on the display 27a of the operation panel 27, generating a predetermined sound from a speaker of the printer 20, which is not illustrated, or changing a color of a lamp of the printer 20, which is not illustrated. Thus, when printing is suspended, the user is able to immediately perform an operation of replacing a target printing material or the like. Therefore, production efficiency is able to be further improved. The controller 26 is configured or programmed, for example, to resume, when release of a printing stop state is instructed by the user, resume print processing of a next print job.

The controller 26 is typically a computer, for example. The controller 26 includes, for example, a central processing unit (CPU) that executes an order of a control program, a read only memory (ROM) that stores a program that is executed by the CPU, a random access memory (RAM) that is used as a working area in which the program is expanded, and a storage, such as a memory or the like, which stores the above described program or various types of data.

The operation panel 27 is used by the user, for example, to check progress of printing or perform an operation related to printing. The operation panel 27 includes the display 27a and an input 27b. The operation panel 27 is, for example, a touch panel that the user can operate by directly touching a display screen. For example, information of the job list, a status of the printer 20, or whether printing is being executed or stopped is displayed on the display 27a. That is, the display 27a also defines and functions as a notifier that notifies the user of a determination result of the continuous printing determiner 26b. The input 27b is a user interface. Information related to printing is input to the input 27b by the user. For example, an instruction to release a printing stop state is input thereto by the user.

The printer 20 further includes an interface (I/F) 28 that is used to perform a communication with the print management device 10. As indicated by an arrow in FIG. 1, the printer 20 receives the job list from the print management device 10 via the interface 28. The job list that has been received is transmitted to the controller 26 of the printer 20.

The print management device 10 is configured or programmed to create and transmit the job list that is used by the printer 20. The job list is configured or programmed as print data in which one or more print jobs are arranged in an execution order of print processing. Each print job includes information of print conditions and data of an image that is printed on a target printing material. For example, the information of print conditions further includes, in addition to information of a print mode that is executed as print processing for one target printing material, information of a print resolution, information of a print range, information of a target printing material, or the like, and continuous printing information that specifies whether or not a next print job is to be continuously printed.

The print management device 10 is typically a computer and, for example, includes a CPU, a ROM, and a RAM. Note that the print management device 10 is herein an external device that is coupled to the printer 20, for example. However, the print management device 10 may be mounted in the controller 26 of the printer 20. Also, the print management device 10 may be a computer program that causes a CPU of a computer to operate as the print management device 10. The computer program may be stored on a non-transitory computer-readable recording medium in which an operation of the print management device 10 is written. Examples of the non-transitory computer-readable recording medium include, for example, a semiconductor recording medium (for example, a ROM or a nonvolatile memory card), an optical recording medium (for example, a DVD, a MO, a MD, a CD, or a BD), a magnetic recording medium (for example, a magnetic tape or a flexible disk), or the like. The above described computer program may be transmitted to a server computer via the above described recording medium or a network, such as the Internet or the like. In this case, the server computer is also one preferred embodiment of the present invention disclosed herein.

The print management device 10 is configured or programmed to include an input 11, a job list creator 12, a storage 13, a display 14, and an output 15. The elements of the print management device 10 are configured or programmed to be communicable with one another. Each of the elements of the print management device 10 may be configured by a software and may be configured by a hardware, or a combination thereof. Each of the elements of the print management device 10 may be operated by a processor and may be incorporated in a circuit. The input 11, the job list creator 12, the storage 13, the display 14, and the output 15 can be replaced with an input circuit 11, a job list creator circuit 12, a storage circuit 13, a display circuit 14, and an output circuit 15, respectively.

The input 11 is a user interface. Necessary information for creating a job list, such as, for example, information of an image that is printed on a target printing material, information of a print mode, information of a target printing material, and continuous printing information, or the like, is input to the input 11. Typically, the above described information is manually input by the user. The input 11 includes, for example, a keyboard including cursor keys, numeric input keys, or the like and a pointing device, such as a mouse or the like. However, the input 11 may be configured or programmed to be able to take in necessary information from an external device, such as a host computer or the like, or a network coupled thereto via a wired or wireless connection. Information that has been input to the input 11 is mutually linked, for example, to each print job or each target printing material and is transmitted to the job list creator 12.

The job list creator 12 receives information that has been input to the input 11. The job list creator 12 is configured or programmed to create a job list in accordance with an instruction of the user. The job list that has been created is transmitted to the output 15. The job list creator 12 is configured, for example, by a computer program of a raster image processor (RIP) installed in the print management device 10. The job list creator 12 is configured or programmed to include an image creator 12a, a print mode setter 12b, a job group constructor 12c, and a continuous printing information provider 12d. Configurations and functions of the elements will be described below in accordance with steps of creating a job list.

Figure 2:
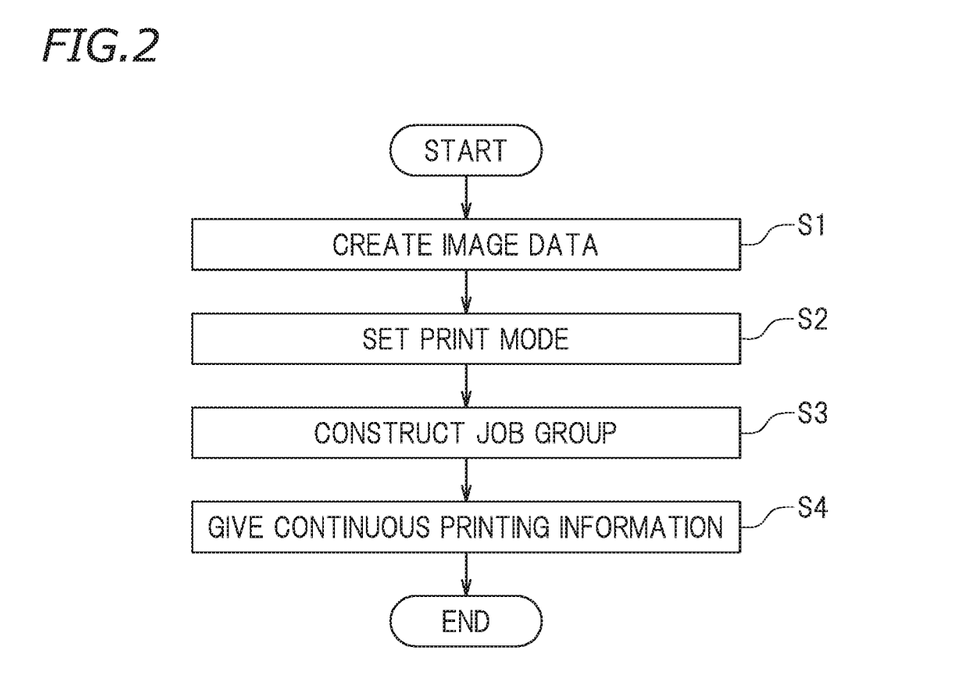
FIG. 2 is an example of a flowchart illustrating steps of creating a job list.

FIG. 2 is an example of a flowchart illustrating steps of creating a job list. In this preferred embodiment, first, in Step S1, data (image data) of an image that is to be printed on a target printing material is created by the image creator 12a in accordance with an instruction of the user. When printing is performed on a plurality of target printing materials, a plurality of image data is created. Note that a configuration of the image creator 12a may be similar to a known configuration. The image creator 12a is configured, for example, by a computer program (so-called image-creating software) which is installed in the print management device 10 and creates image data as postscript data. The postscript data that has been created by the image creator 12a is rasterized into point information by RIP. However, the data of the image that is printed on the target printing material may be created, for example, using a computer that is different from the print management device 10 or be acquired via a network, such as the Internet or the like, and then, be stored in the storage 13 in advance. The image data is, for example, linked to information of the target printing material which has been input from the input 11 and is stored as one work file, for example, by unit of target printing material in the storage 13.

Next, in Step S2, a print mode is set for each target printing material by the print mode setter 12b. When printing is performed on a plurality of the target printing materials, a print mode is set for each of the target printing materials. Note that a configuration of the print mode setter 12b may be similar to a known configuration. A print mode is selected by the user, for example, from a single-layer print mode including one print job, a two-layer print mode including two print jobs, and a multi-layer print mode including three or more print jobs. The single-layer mode is a print mode in which, for example, a process color ink is discharged from the ink head 24 to form one process color ink layer on a target printing material. The two-layer print mode is a print mode in which, for example, a process color ink and a special color ink are sequentially discharged from the ink heads 24 to form two layers, that is, one process color ink layer and one special color ink layer, in total as stacked layers. The multi-layer print mode is a print mode in which, for example, three or more layers, that is, for example, three to five layers, of process color ink and special color ink layers, in total are formed as stacked layers. The print mode that has been set is linked to information that has been input to the input 11 and is stored as one work file in the storage 13.

A print mode is determined, for example, in accordance with whether or not a previous process to form a base layer before a process color ink is printed is required, whether or not a post-process to perform surface finish after a process color ink is printed is required, or the like. In one preferred embodiment of the present invention, a print mode is automatically selected based on the information of a target printing material, which has been input to the input 11. Alternatively, one or more print modes are displayed on the display 14 so that the user can compare the print modes and select a print mode. For example, the print mode setter 12b is configured or programmed to automatically determine, based on the information of a target printing material which has been input to the input 11, whether or not a previous process is required to perform surface preparation using a primer ink and/or a white ink and whether or not a post-process is required to perform surface finish using a coating ink, then select one or more printing modes, based on results of the above described determination, and display the selected one or more print modes on the display 14.

For example, if a material of the target printing material which has been input to the input 11 is a material which has a high ink repellent property such as leather, glass, or the like, the print mode setter 12b selects a print mode in which surface preparation using a primer ink is performed. Also, for example, if the material of the target printing material which has been input to the input 1 is a material which has a high ink-philic property such as resin, carbon, or the like, the print mode setter 12b selects a print mode in which surface preparation using a primer ink is not performed. Also, for example, if a ground color of the target printing material which has been input to the input 11 is transparent or a dark color (black, dark blue, brown, or the like), the print mode setter 12b selects a print mode in which surface preparation using a white ink is performed. Also, for example, if the ground color of the target printing material which has been input to the input 11 is white or a light color, the print mode setter 12b selects a print mode in which surface preparation using a white ink is not performed. Also, for example, if the target printing material which has been input to the input 11 has a gross feeling, the print mode setter 12b selects a print mode in which surface finish using a coating ink is performed. Also, for example, if the target printing material which has been input to the input 11 does not have a gross feeling, the print mode setter 12b selects a print mode in which surface finish using a coating ink is not performed.

Next, in Step S3, print jobs included in a job list are sequentially grouped to be divided into one or more job groups by the job group constructor 12c, based on a reference that has been set in advance. The reference of grouping is able to be arbitrarily set by the user. As an example, the job group constructor 12c groups the print jobs by unit of print product in an order in which the print jobs are arranged in the job list to divide the print jobs into the job groups. As another example, the job group constructor 12c groups the print jobs by unit of target printing material replacement, that is, at a timing at which one target printing material is replaced with another in the order in which the print jobs are arranged in the job list, to divide the print jobs into the job groups. The unit of target printing material replacement can be arbitrarily set by the user in consideration of an actual printing work or the like. Information of each of the job groups that have been defined by the job group constructor 12c is added to a corresponding work file that is stored in the storage 13 and is linked to information of print conditions, that is, for example, information of the print mode. Note that Step S3 is not necessarily performed and can be omitted. In this case, the job list creator 12 may not include the job group constructor 12c.

Next, in Step S4, continuous printing information is given to each print job of the print mode by the continuous printing information provider 12d. The continuous printing information specifies whether or not a subsequent print job in the job list is to be continuously printed. The continuous printing information is, for example, represented by ON/OFF. If continuous printing is "ON", it is meant that a subsequent print job is to be continuously printed. If continuous printing is "OFF", it is meant that a subsequent print job is not to be continuously printed. The continuous printing information that has been given by the continuous printing information provider 12d is added as the information of print conditions to the work file that is stored in the storage 13.

In one preferred embodiment of the present invention, the continuous printing information provider 12d tentatively gives the continuous printing information automatically, based on the information of the job groups that have been constructed by the job group constructor 12c. Specifically, the continuous printing information provider 12d tentatively gives an attribute of continuous printing "OFF" to a last print job of each of the job groups. On the other hand, the continuous printing information provider 12d tentatively gives an attribute of continuous printing "ON" to the other print jobs, that is, first and intermediate print jobs, other than the last print job of each job group. The continuous printing information that has been given to each print job may be changed by the user as appropriate. The continuous printing information that has been given to each print job is finally determined, for example, by the user. Also, in a case in which Step S3 is omitted or like case, the user can also manually give the continuous printing information to each print job independently. In the above described manner, the job list is created by the job list creator 12.

A work file of a job list including, for example, image data, a print mode, a job group, continuous printing information, or the like is stored in the storage 13. Also, for example, a job list that is transmitted to the printer 20 is stored in the storage 13.

In one preferred embodiment of the present invention, a print condition file to which information of a target printing material, information of a print mode, and continuous printing information are linked is stored in the storage 13. For example, print condition files (which will be hereinafter referred to as variation files as appropriate) of a plurality of variations in which a different print mode is set for each print product are stored in the storage 13. That is, the variation files are the print condition files which have the information of target printing materials that is the same, and the information of print mode information that mutually differs. The variation files are stored such that the user can arbitrarily select one or more of the variation files, for example, for at least one of the purposes of (1) handling target printing materials having different properties, (2) coping with change of a print surface of a target printing material that has a front surface and a back surface, and (3) adjusting at least one of print quality, a print cost, and a required time for printing. The variation files are displayed on the display 14 such that the user can easily compare the variation files and select one or more of the variation files.

Figure 3:
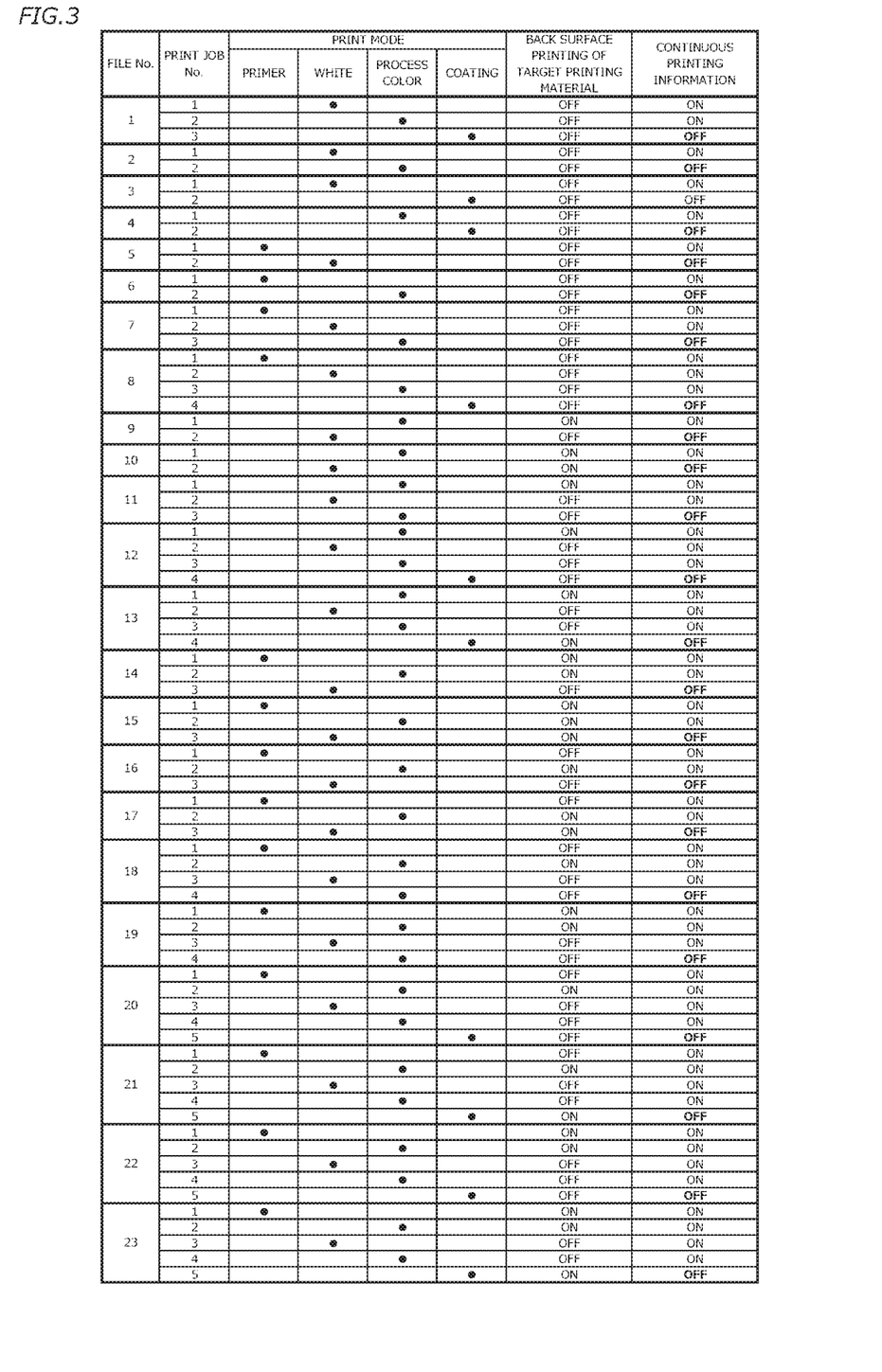
FIG. 3 is a table illustrating examples of a print mode including continuous printing information.

In FIG. 3, as examples of the variation files, variation files No. 1 to No. 23 are illustrated. For example, the variation file No. 1 is a file of a multi-layer print mode which includes print jobs 1 to 3 and is configured or programmed such that a white ink, a process color ink, and a coating ink are superimposed and printed in this order to form three ink layers on a target printing material. Note that "back surface printing" is a way of printing an image on a target printing material on the assumption that a surface on which printing is performed is a back surface and a print product is looked at from a surface (front surface) on an opposite side to the print surface (back surface). Also, in FIG. 3, information included in each variation file is displayed in a table format so as to be easily visually recognized but an actual variation file is created in, for example, a source code described in a program language. In this case, a variation file that has been created in a source code is a data file in a text format.

Continuous printing information has been already given to the variation files of FIG. 3 by unit of print product. The user can easily perform the above described job list creation by selecting and applying one or more of the variation files as appropriate. Specifically, the user can easily perform steps from setting of a print mode in Step S2 to giving continuous printing information in Step S4 in the flowchart of FIG. 2.

In one preferred embodiment of the present invention, first, in setting of a print mode in Step S2, based on information of a target printing material which has been input from the input 11, a plurality of variation files is displayed on the display 14. For example, if a ground color of the target printing material which has been input to the input 11 is transparent or a dark color, a plurality of variation files, that is, a file of a high quality type, which includes a print job using a white ink, and a file of a low cost type, which does not include a print job using a white ink, between which there is only a difference in whether or not a white ink is used, are displayed so as to be aligned. Also, for example, if the target printing material which has been input to the input 11 has a gross feeling, a plurality of variation files, that is, a file of a high quality type, which includes a print job using a coating ink, and a file of a low cost type, which does not include a print job using a coating ink, between which there is only a difference in whether or not a coating ink is used, are displayed so as to be aligned. The user can easily create a job list including continuous printing information by arbitrarily selecting one, or two or more of the variation files and arranging the selected variation files in an order of execution by unit of print product. Thus, a setting error of a print job hardly occurs and even a user who is not proficient in printing can get various print products without failing.

The display 14 displays information or the like that is stored in the storage 13 such that the user can visually recognize the information or the like. The display 14 is, for example, a liquid crystal display. The display 14 may be a touch panel that also defines and functions as the input 11. The display 14 may be configured or programmed to display print conditions, such as, for example, a print mode or the like, in a table format. The display 14 may be configured to display, for example, data of an image that is printed on a target printing material as a preview screen. For example, the display 14 may be configured or programmed to display a plurality of variation files when information of a target printing material or the like is input to the input 11 by the user.

The output 15 receives a job list that has been created by the job list creator 12. The output 15 transmits the information of print conditions included in the job list and the data of the image to the printer 20. As described above, the controller 26 of the printer 20 controls the table 21, the ink head 24, the ultraviolet lamp 25, or the like, based on a print job in the job list that has been received, and performs printing on a target printing material.

Some specific working examples in which a job list is created in accordance with the above described steps of creating a job list will be described below.

In a first working example, a case in which a print mode in which, in Step S1, image data that corresponds to three target printing materials in total is created and, in Step S2, a white ink, a process color ink, and a coating ink are superimposed and printed in this order on each of target printing materials 1 to 3 has been selected is assumed.

TABLE 2

Table 2 Job List in First Working Example

| Step S1 Target Printing Material No. (Serial Number) | Step S2 | | Step S3 Job Group per Target Printing Material | Step S4 Continuous Printing Information |
|---|---|---|---|---|
| | Print Job No. (Serial Number) | Print Mode | | |
| 1 | Job 1 | Printing with White Ink | 1 | ON |
| | Job 2 | Printing with Process Color Ink | | ON |
| | Job 3 | Printing with Coating Ink | | OFF |
| 2 | Job 4 | Printing with White Ink | 2 | ON |
| | Job 5 | Printing with Process Color Ink | | ON |
| | Job 6 | Printing with Coating Ink | | OFF |
| 3 | Job 7 | Printing with White Ink | 3 | ON |
| | Job 8 | Printing with Process Color Ink | | ON |
| | Job 9 | Printing with Coating Ink | | OFF |

In this preferred embodiment of the present invention, in Step S3, it is assumed that the user has set dividing of print jobs into job groups by unit of target printing material. Thus, in the job group constructor 12c, print jobs included in a job list are sequentially grouped by unit of target printing material and are divided into three job groups. Next, in Step S4, continuous printing information is tentatively given by the continuous printing information provider 12d automatically, based on information of the job groups that have been constructed by the job group constructor 12c. In this case, an attribute of continuous printing "OFF" is tentatively given only to the last print job of each of the job groups. The user checks continuous printing information that has been tentatively given and decides the continuous printing information. In accordance with this job list, in the printer 20, after printing on each target printing material ends, each printing is suspended. For example, after the print jobs 1 to 3 are continuously printed, printing is suspended. Therefore, the user can replace the target printing material at a timing at which the print job 3 ends and the printer 20 is suspended. Also, after the target printing material is replaced, when the user instructs the printer 20 to release a printing stop state, printing is resumed and continuous printing of next print jobs 4 to 6 is performed. As described above, in the first working example, using one job list, three continuous printings and two target printing material replacements are alternately repeated and three print products in total are achieved.

In a second working example, a case in which, in Step S1, image data that corresponds to three target printing materials in total is created and, in Step S2, print modes below are selected for the target printing materials 1 to 3 is assumed.

TABLE 3

Table 3 Job List in Second Working Example

| Step S1 Target Printing Material No. (Serial Number) | Print Job No. (Serial Number) | Step S2 Print Mode | Step S3 Job Group per Target Printing Material Replacement | Step S4 Continuous Printing Information |
|---|---|---|---|---|
| 1 | Job 1 | Printing with White Ink | 1 | ON |
|  | Job 2 | Printing with Process Color Ink |  | ON |
|  | Job 3 | Printing with Coating Ink |  | ON |
| 2 | Job 4 | Printing with White Ink |  | ON |
|  | Job 5 | Printing with Process Color Ink |  | OFF |
| 3 | Job 6 | Printing with White Ink | 2 | ON |
|  | Job 7 | Printing with Process Color Ink |  | OFF |

In this preferred embodiment, it is assumed that, in Step S3, the user has specified a unit of target printing material replacement and has set dividing of print jobs into job groups by unit of target printing material replacement. That is, if target printing materials 1 and 2 can be simultaneously placed on the table 21, it is not needed to replace a printing material between the target printing materials 1 and 2 and continuous printing is possible. Thus, in the job group constructor 12c, print jobs included in a job list are sequentially grouped by unit of target printing material replacement and are divided into two job groups. Next, in Step S4, continuous printing information is tentatively given by the continuous printing information provider 12d automatically, based on information of the job groups that have been constructed by the job group constructor 12c. In this case, an attribute of continuous printing "OFF" is tentatively given only to a last print job of each of the job groups. The user checks continuous printing information that has been tentatively given and decides the continuous printing information. In accordance with the job list, in the printer 20, after the print jobs 1 to 5 are continuously printed and printing on each of the target printing materials 1 and 2 ends, printing is suspended. Therefore, the user can replace the target printing material at a timing at which the print job 5 ends and the printer 20 is suspended. Also, after the target printing material is replaced, when the user instructs the printer 20 to release a printing stop state, printing is resumed and remaining print jobs 6 and 7 are continuously printed. As described above, in the second working example, using one job list, one target printing material replacement is performed between two continuous printings and three print products in total are achieved.

As has been described above, in the print management device 10 of this preferred embodiment, a job list in which continuous printing information is given to each print job is created. Thus, in this preferred embodiment, if replacement of a target printing material is needed in the middle of the job list, the print jobs can be collectively transmitted to the printer by one output. Also, the printer 20 of this preferred embodiment includes the continuous printing determiner 26b and determines for each print job whether or not a next print job is to be continuously printed, based on the above described job list. Thus, it is possible to set print jobs which are not required to replace a target printing material or the like are continuously executed and, on the other hand, to set print jobs which are required to replace a target printing material or the like are suspended. With the above described configuration, using the printing system 1, for example, as compared to a case in which a job list is divided into multiple parts and each of divided parts is output to the printer 20, time and effort of the user are able to be reduced and efficiency of an operation of the user is able to be increased. Moreover, a large quantity of print products is able to be mass produced at low cost.

Also, in a mass-production phase, in some cases, the print management device 10 and the printer 20 are spaced apart from one another. In such a case, with a known printing system, the user has to move back and forth between the devices. In contrast, with the printing system 1 of this preferred embodiment, a moving distance of the user is able to be reduced and a physical burden of the user is able to be reduced.

In a further advanced phase of mass production, in some cases, different persons (operators) operate the print management device 10 and the printer 20. For example, the print management device 10 is operated by an operation leader who is proficient in creation of image data or setting of print conditions and an operation of the printer 20, and an operation of replacing target printing materials are performed by an on-site operator. In such a case, with a known printing system, the operation leader has to estimate a timing when printing in execution ends and transmit a job list to the printer each time. In contrast, with the printing system 1 of this preferred embodiment, a job list is able to be transmitted to the printer 20 by one output. Therefore, the operation leader is able to do other operations in a spare time and work efficiency is able to be largely improved.

In this preferred embodiment, the print management device 10 further includes the job group constructor 12c that is configured or programmed to sequentially group print jobs included in a job list and divide the print jobs into one or more job groups, based on a predetermined reference. The continuous printing information provider 12d is configured or programmed to specify to perform continuous printing for first and intermediate ones of the above described print jobs of each of the job groups and specify not to perform continuous printing for the last one of the above described print jobs of each of the job groups. Thus, it is possible to prevent input errors of continuous printing information in advance and work efficiency of the user can be further improved.

In this preferred embodiment of the present invention, a job list includes a plurality of print jobs in accordance with which printing is sequentially performed on a plurality of target printing materials. The job group constructor 12c may be configured or programmed to divide a plurality of print jobs into job groups by unit of target printing material. The job group constructor 12c may be configured or programmed to divide a plurality of print jobs into job groups by unit of target printing material replacement, that is, at a timing when one target printing material is replaced with another. Thus, an input error of continuous printing information is able to be prevented in advance and work efficiency of the user is able to be remarkably improved.

In this preferred embodiment of the present invention, the print management device 10 further includes the storage 13 that stores a print condition file to which information of a target printing material, information of a print mode that is executed as one print processing, and the continuous printing information are linked. Using the print condition file, an input error of the continuous printing information is able to be prevented in advance. Moreover, the user does not have to create a job list from a scratch and can easily create a job list. Therefore, convenience of the user is able to be improved.

In this preferred embodiment of the present invention, the storage 13 of the print management device 10 stores, as the print condition file, a plurality of variation files which contain the same information of target printing materials while the print mode information mutually differs. Thus, even a user who has less knowledge or experience for printing is able to easily perform setting of print conditions and achieve various kinds of print products successfully. Therefore, convenience of the user is able to be improved.

In this preferred embodiment of the present invention, the printer 20 further includes the notifier 27a that notifies a user of a determination result of the continuous printing determiner 26b. Thus, an operator is able to easily know a state of the printer 20, that is, for example, whether continuous printing is being performed or is being suspended, via the notifier 27a. Therefore, work efficiency or convenience of the user is able to be improved.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printing system comprising:
    a print management processor that creates a job list in which a plurality of print jobs of printing a plurality of ink layers onto a respective target printing material are arranged in an execution order; and
    a printer that performs printing on a plurality of target printing materials, based on the job list; wherein
    the print management processor is configured or programmed to give, to each of the print jobs of printing ink layers, continuous printing information in which whether a next one of the print jobs is to be continuously printed onto the respective target printing material or temporarily stopped is specified; and
    the printer includes a controller that is configured or programmed to continuously start without receiving any instructions from a user of the printer, if specified by the continuous printing information of the print job to perform continuous printing, printing of a second print job after printing of a first print job is completed, and to stop temporarily until an instruction from the user of the printer is received, if specified by the continuous printing information of the print job not to perform continuous printing, printing of the second print job after printing of the first print job is completed.

2. The printing system according to claim 1, wherein
    the print management processor is configured or programmed to sequentially group the print jobs of printing ink layers onto the respective target printing material included in the job list to divide the print jobs into one or more job groups, based on a predetermined reference; and
    the print management processor is configured or programmed to specify to perform continuous printing to first and intermediate ones of the print jobs of each of the print groups and to specify not to perform continuous printing to a last one of the print jobs of each of the job groups.

3. The printing system according to claim 2, wherein
    the job list includes the plurality of print jobs of printing ink layers onto the respective target printing material in accordance with which printing is sequentially performed on the plurality of target printing materials; and
    the print management processor is configured or programmed to divide the plurality of print jobs of printing ink layers into the job groups by unit of the respective target printing material.

4. The printing system according to claim 2, wherein
    the job list includes the plurality of print jobs of printing ink layers in accordance with which printing is sequentially performed on the plurality of target printing materials; and
    the print management processor is configured or programmed to divide the plurality of print jobs into the job groups by unit of a target printing material replacement that is defined as a timing at which one or more of the target printing materials are replaced.

5. The printing system according to claim 2, wherein
    the predetermined reference is a printing order for the plurality of target printing materials on which one or more of the plurality of ink layers is to be printed.

6. The printing system according to claim 1, wherein the print management processor further includes a storage that stores a print condition file to which information of the plurality of target printing materials, information of a print mode that is executed as one print processing, and the continuous printing information are linked.

7. The printing system according to claim 6, wherein the storage of the print management processor stores, as the print condition file, a plurality of variation files the information of target printing materials of which is the same and the print mode information of which mutually differs.

8. The printing system according to claim 1, wherein the printer further includes a display that displays a determination result of the controller.

9. A non-transitory computer-readable recording medium storing a computer program that causes a computer to operate as the print management processor according to claim 1.

10. The printing system according to claim 1, wherein the print management processor is configured or programmed to provide, to a plurality of the print jobs, the continuous printing information in which a next one of the print jobs is to be temporarily stopped.

11. The printing system according to claim 1, wherein the print management processor and the printer are configured to be operated by different users.

12. The printing system according to claim 1, wherein the print management processor is separate from and outside of the printer.

13. The printing system according to claim 1, wherein the printer is a photocurable inkjet printer.

14. The printing system according to claim 13, wherein the printer is a flatbed printer that includes a table, a plurality of ink cartridges, an ink head, and an ultraviolet lamp.

15. The printing system according to claim 14, wherein each of the plurality of ink cartridges stores an ultraviolet curable ink.

16. The printing system according to claim 15, wherein:
- at least one of the plurality of ink cartridges stores a process color ink; and
- at least one of the plurality of ink cartridges stores a special color ink that differs in at least one of color and property from the process color ink.

17. The printing system according to claim 1, wherein the controller is configured or programmed to control the printer to print one or more of the plurality of ink layers on the plurality of target printing materials, if specified by the continuous printing information of one or more of the plurality of print jobs of printing ink layers to perform continuous printing.

* * * * *